Figure 1:
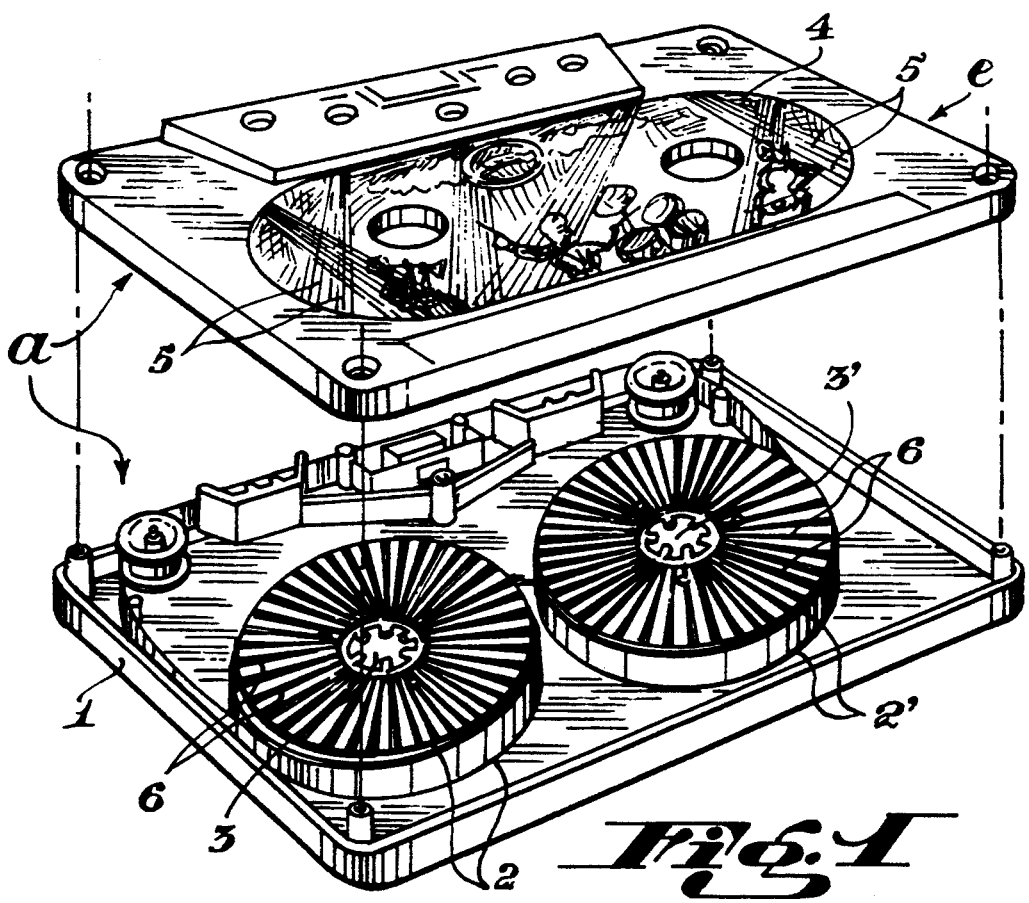

United States Patent [19]

Kaplan

[11] Patent Number: 5,364,040

[45] Date of Patent: Nov. 15, 1994

[54] VISUAL EFFECTS FOR RECORDING TAPE CASSETTES

[76] Inventor: Osvaldo Kaplan, Av. del Libertador 3672, 9th floor, Buenos Aires, Argentina

[21] Appl. No.: 876,122

[22] Filed: Apr. 29, 1992

Related U.S. Application Data

[63] Continuation of Ser. No. 563,247, Aug. 6, 1990, abandoned.

[30] Foreign Application Priority Data

Aug. 8, 1989 [AR] Argentina ................ 314612
Aug. 1, 1990 [AR] Argentina ................ 317513

[51] Int. Cl.5 ........................................ G11B 23/087
[52] U.S. Cl. .................................... 242/347; 360/132
[58] Field of Search ............ 242/199; 360/132; 352/78 R; D14/121

[56] References Cited

U.S. PATENT DOCUMENTS

| 2,937,818 | 5/1960 | Form | 242/199 |
|---|---|---|---|
| 2,988,295 | 6/1961 | Loewe | 242/199 |
| 3,558,142 | 1/1971 | Poessel | 242/199 |
| 3,718,290 | 2/1973 | Wright | 242/199 |
| 3,752,113 | 8/1973 | Blechman | 360/132 |
| 3,810,246 | 5/1974 | Stone, Jr. et al. | 242/199 |
| 3,912,194 | 10/1975 | Chan | 242/199 |
| 4,345,540 | 8/1982 | Karmin | 360/137 |
| 4,501,396 | 2/1985 | Tomsyck et al. | 242/199 |
| 4,752,046 | 6/1988 | Wulfing | 242/199 |

FOREIGN PATENT DOCUMENTS

| 3813359 | 11/1989 | Germany | 360/132 |
|---|---|---|---|
| 2016414 | 9/1979 | United Kingdom | 360/132 |
| 2113395 | 8/1983 | United Kingdom | 360/132 |
| 2119752 | 11/1983 | United Kingdom | 242/199 |

*Primary Examiner*—Daniel P. Stodola
*Assistant Examiner*—John Q. Nguyen
*Attorney, Agent, or Firm*—Scully, Scott, Murphy & Presser

[57] ABSTRACT

A recording tape cassette which includes two sets of printed material disposed between an outer disk of each tape reel and a wall of the cassette case. The first set of printed material comprises a plurality of lines which cross obliquely with respect to visual fields of the second set of printed material such that in response to the rotation direction of the tape reels, both sets of printed material combine to produce an optical effect of turbulence.

20 Claims, 3 Drawing Sheets

1

VISUAL EFFECTS FOR RECORDING TAPE CASSETTES

This is a continuation of copending application Ser. No. 563,247 filed on Aug. 6, 1990, now abandoned.

BACKGROUND

The present invention relates to improvements in recording tape cassettes and it aims to give said structure elements which are intended to produce visual effects in order thus to form a medium for publicity or visual communication.

Said medium and dynamic visual effects are the result of the combination of static elements (such as the case or actual cassette) and the moving reels; taking advantage of the normal rotational effect thereof, especially in the forward direction, upon actuation by the drive shaft of the playback/recording equipment.

With reference to knowledge of this subject, it may be stated that little or nothing exists in respect thereof.

At most, mention may be made of phonographic disks whose label includes a drawing in bands, intended to produce a stroboscopic effect, either with purely esthetic purposes or in order to act as a control in the selection of the appropriate playback speed. In this way it was possible to ascertain that the system was operating at the correct speed, if, upon rotation, the above-mentioned stroboscopic effect was produced, whilst if there was distortion this would mean that the speed was incorrect due to any defect arising in the actuating means, such as slipping in the transmission means, for example:

In the present case, it is possible to combine the presence of the static walls of the cassette with the rotational movement of the tape-holder reels; producing optical effects of undulating movements or turbulence, which, combined with a printed design, permit use thereof as information, decorative or publicity media.

This is extremely interesting since, through publicity, it is possible to offset somewhat and consequently reduce the cost of producing the cassettes, rendering these more accessible.

Of course, publicity which uses new optical effects will preferably have some connection or affinity with the target public, its age range, etc. (for example, in the case of a modern music cassette for a young audience, the publicity may refer to alcohol-free drinks, youthful fashions, sports, etc.).

As regards the actual cassette, this retains its basic structure and characteristics and its normal mode of operation; very few structural and design modifications being required between the walls of the cassette and the disks of the tape-holder reels in order to produce said optical effect.

In one of the preferred embodiments, provision has been made for the printed drawing to be located on a sheet which is disposed loose inside the cassette and on the reels.

Or, in addition, said sheet is adhered internally or externally to the wall of the actual cassette.

All the foregoing suggests that the invention must be acceptable when implemented, regardless of the category and purpose given thereto, since, by virtue of the characteristics defining it, it is equally applicable to publicity, esthetic or informative purposes, both in audio "cassettes", video cassette decks, magazines, etc.

MAIN OBJECTIVE

For the purposes specified in this description, the improvements to recording tape cassettes are of the type which comprises a case (a) formed by two flattened bodies (1) which are connected together defining a container which is closed on the perimeter on three of its sides and open on one side which, forming a passage for recording tape which may be brought opposite the relevant head of the recording/playback equipment, is fed on the inside by two reels (2) (2') for relative reciprocal winding/unwinding of tape, which have corresponding hollow spindles (3) (3') with inner teeth which can be coupled to the drive spindles of said recording/playback equipment, which confers on said reels (2-2') a rotational actuation about their respective spindles (3-3'); wherein, between the outer disk (b) of each reel (2-2') and the immediate walls of the case (a) are disposed two sets of printed material, the first of which comprises a plurality of lines (6) which cross obliquely with respect to visual fields (5) of the same components of the second set of printed material (e); such that both sets of printed material, in response to the direction of rotation of the reels (2-2'), are capable of defining an optical effect of turbulence which complements a drawing forming a visual communication message.

ILLUSTRATION

For greater clarity and comprehension of the ojective of the invention, it is illustrated with several figures in which it has been shown in one of the preferred embodiments; all simply as a descriptive, non-limiting, example:

FIG. 1 being an expanded perspective view of the improved cassette, clearly showing the drawing forming the visual communication message on one of the principal walls of said cassette, with the visual fields, and one of the possible lines of the disks which form the tape reels, which can be combined with said fields.

Figure 2:
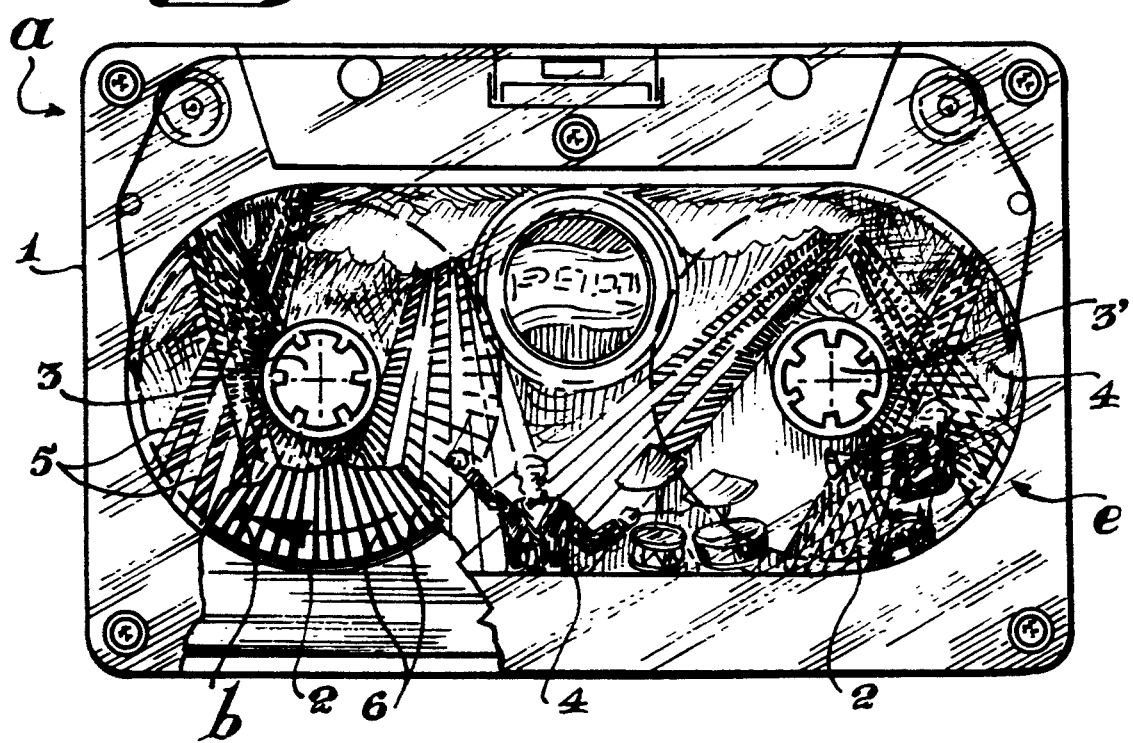

FIG. 2 being a plan view of the assembled cassette under normal use conditions, showing how the rotation of the reels, the crossing of the lines and corresponding optical effect of turbulence with publicity purposes or of another type are combined.

Figure 3:
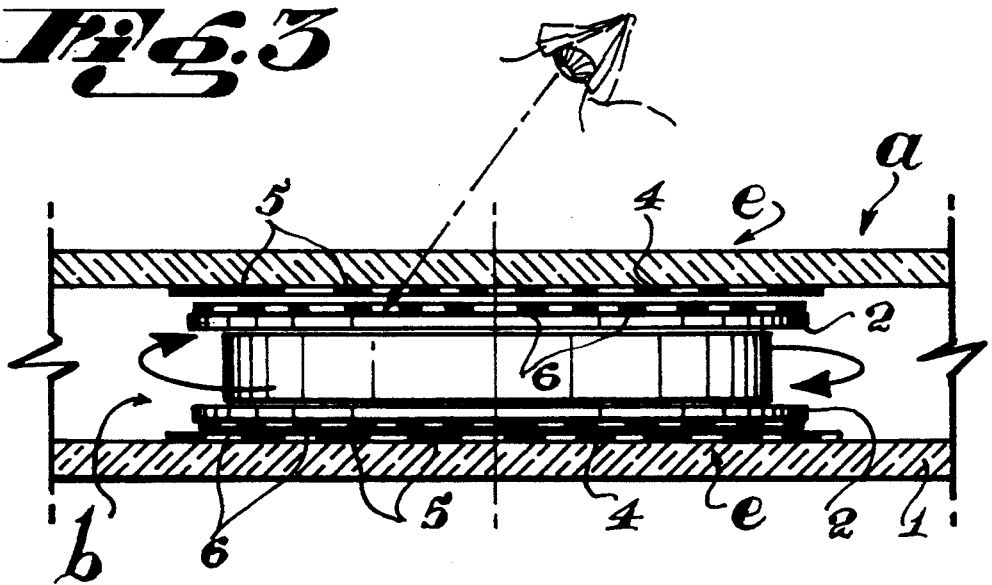
Figure 4:
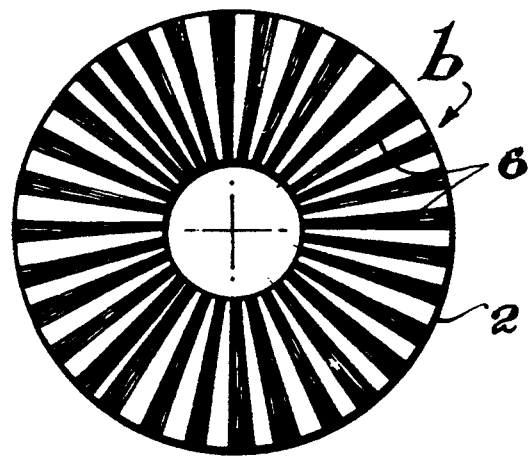
Figure 4:
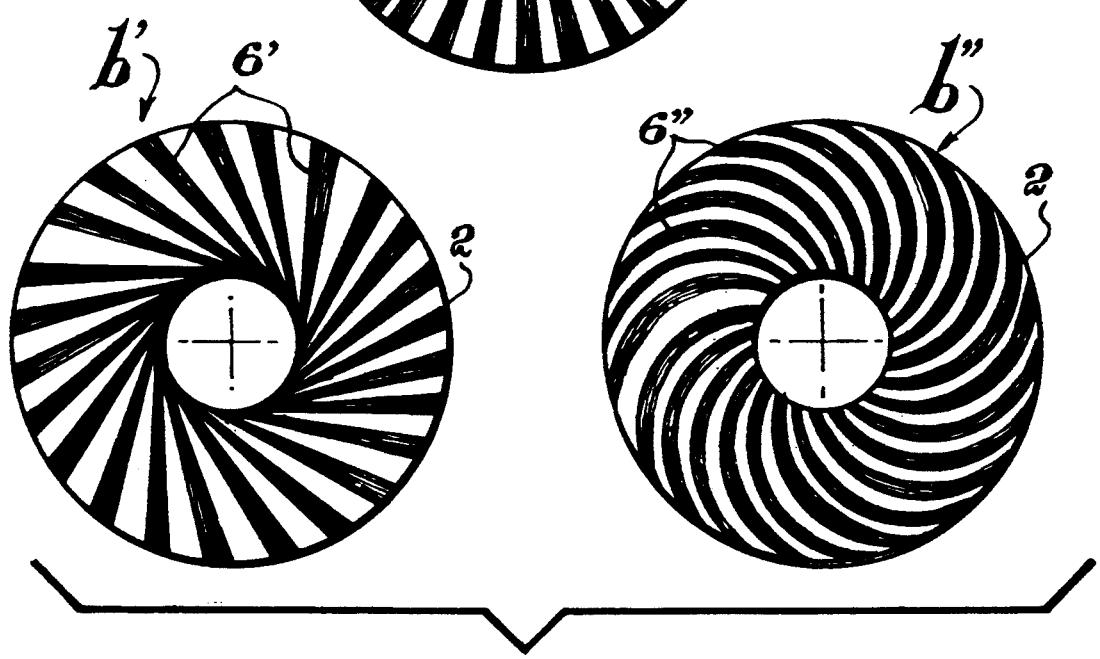

FIG. 3 being a cross-section of the assembled cassette, at a detail of one of the reels, indicating the manner of visualization of the optical effect of turbulence produced by the passage of the oblique lines via the visual fields prepared therefor; and finally, FIG. 4 being a view of 3 reel disks with different illustrative embodiments of the oblique lines.

Figure 5:
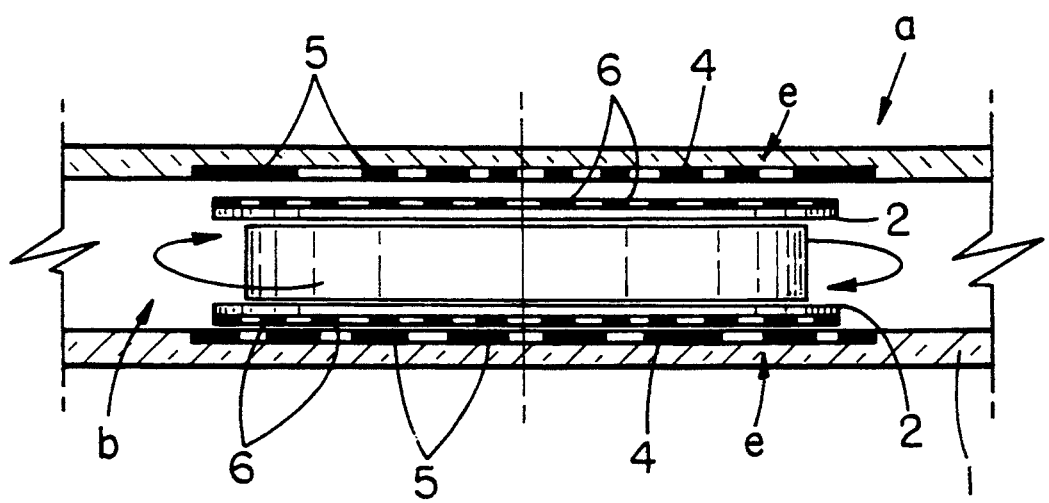

FIG. 5 is a cross-sectional view of the assembled cassette showing an alternative embodiment of the location of the printed sheet.

In the different figures, the same reference numbers indicate identical or corresponding parts; letters indicating the assembly of various elements.

These references correspond to the following detail in which:

(a)—case
(b)—outer disk of each reel
(b')—first variant of line drawing
(b")—second variant of line drawing
(e)—drawing forming the visual communication message
(1)—walls of flattened bodies of (a)
(2)—reel of recording tape
(2')—reel of recording tape
(3)—hollow spindle of (2)

(3')—hollow spindle of (2')
(4)—sheet of drawing (e)
(5)—visual fields
(6)—radial oblique lines of (b)
(6')—inner tangential oblique lines of (b')
(6")—cycloidal oblique lines of (b")

DESCRIPTION

In general terms, said cassette is of the type which comprises a case (a) formed by two flattened bodies (1), each one of which is formed by a larger main wall and small lateral walls which are connected together.

These bodies (1) together define a container which is closed on the perimeter on three of its sides (two transverse and one longitudinal) and open on a longitudinal side which, forming a passage for recording tape, can be brought opposite the head of the equipment via two reels (2) and (2') for relative reciprocal winding/undwinding of tape.

The reels (2) and (2') have hollow spindles (3) and (3'), respectively provided with inner teeth, (FIGS. 1 and 2), with which they couple with the drive spindles corresponding to the relevant recording/playback equipment, which confers on said reels (2-2') a rotational actuation about their respective spindles (3-3').

More particularly, and as may be seen in the figures, the outer disks (b) of each cassette have printed a plurality of lines (6) which cross obliquely with respect to the visual fields (5) thereof, disposed on the principal obverse and reverse walls (1) of the cassette, which are next to said disks (b), (FIG. 1).

Said principal walls (1) of the cassette have printed material (e) which corresponds to a sheet (4) which is adhered or directly printed/engraved or by means of a suitable printed sheet on said walls (1), (internally or externally) which represents a drawing similar to the optical effect which can be obtained in accordance with the present invention, such as, for example, a playing orchestra in which some of the instruments thereof, (for example wind instruments) show at the output thereof the zones or visual fields (5) in order to form effects of wind turbulence; a panoramic view of cascading water, cataracts or waterfalls, coinciding with such visual fields (5), intended to form effects of waves or water turbulence; a group of young people together and bottles of alcohol-free drink which are open, coinciding with the visual fields (5) in order to form the appearance of streams of drink emerging from the container; group of persons dancing, between light rays coinciding with the fields (5), etc., (FIGS. 2 and 3).

In order to form this effect, the principal walls (1) are preferably opaque (at least in the part corresponding to the drawing or printed material e), whereas in the zone of the visual field (5) they permit light to pass through and make it possible to see through them by means of tiny cutouts or tiny transparent or translucent lines (FIGS. 1 to 3).

For their part, the disks (b) of the reels (2) and (2') which are disposed coinciding beneath (5) (as already stated) have printed a plurality of lines (6) which cross obliquely with respect to the lines or cutouts (5) and which, in response to the direction of rotation of the reels (2-2'), are capable of defining the corresponding optical effect of undulation or tubulence which complements the drawing (e) forming the visual communication message.

As regards these lines on the reels (b), (b') or (b"), these may be radial (6), cycloidal (b'), epicycloidal (b"), etc. (FIG. 4).

Another of the possible embodiments makes provision for it to be possible for the drawing (e) to be printed on the inner face or on the outer face of the case (a).

However, one of the preferred embodiments is that which makes provision for the printing of (e) on a sheet which can be disposed loose between the reels (2) and (2') of the cassette (a). For this purpose, as shown in FIG. 5, the cassette can have a depression or shallow cavity which is required to contain said sheet.

For the same purposes of the preferred illustrative embodiment already mentioned and as a new alternative embodiment, provision is made for it to be possible for said cavity to have small stubs or stops intended to hold said sheet with the printing (e) in position.

As a final alternative embodiment, provision has likewise been made for the fact that said sheet with the printed material (e) can be adhered to the walls of the cassette (a), either on the inner face or on the outer face, without distinction.

Undoubtedly, when the present invention is implemented, modifications may be introduced as regards certain details of construction and form, without this implying a departure from the fundamental principles which are clearly stated in the claims which follow hereinafter:

Having thus especially described and determined the nature of the present invention and the manner in which it may be implemented, the following is claimed as exclusive right and property:

1. A tape cassette comprising first and second bodies having first and second walls respectively, said first and second walls being parallel to each other, said first and second bodies being connected together defining a six sided cassette which is open on one side which forms a passage for recording tape which may be brought opposite an element head of a recording/playback device, first and second spaced tape reels mounted in said cassette rotatably about respective axes extending perpendicular to said first and second walls, each of said tape reels being provided with a disk laterally disposed thereon and having corresponding hollow spindles with inner teeth which can be coupled to drive spindles of said recording/playback device which confers on said reels a rotational activation about their respective spindles, on one of the walls of the cassette there is a partly opaque drawing having visual fields therethrough which correspond to portions of said drawing which show an object in motion, an outer surface of at least one of the disks having a printed material comprising a plurality of lines a portion of which can be observed through and cross obliquely with said visual fields such that when the reels are rotating the plurality of lines and the visual fields interact with each other to produce optical motion effect zones with complements the drawing and corresponds to portions of the rotating plurality of lines that can be observed through the visual fields.

2. The tape cassette as claimed in claim 1, wherein the drawing is printed on a sheet.

3. The tape cassette as claimed in claim 2, wherein the printed sheet is disposed loose on the reels, inside the cassette.

4. The tape cassette as claimed in claim 3, wherein the printed sheet is disposed on a small depression in said one of said walls, inside the cassette.

5. The tape cassette as claimed in claim 2, wherein the printed sheet is disposed adhered to a face of the first wall of the cassette.

6. The tape cassette as claimed in claim 5, wherein the printed sheet is disposed adhered to an inner face of the first wall of the cassette.

7. The tape cassette as claimed in claim 5, wherein the printed sheet is disposed adhered to an outer face of the first wall of the cassette.

8. The tape cassette as claimed in claim 1, wherein the visual fields are transparent.

9. The tape cassette as claimed in claim 1, wherein the visual fields are translucent.

10. The tape cassette as claimed in claim 1, wherein the visual fields are tiny transparent lines.

11. The tape cassette as claimed in claim 1, wherein the visual fields are tiny translucent lines.

12. The tape cassette as claimed in claim 1, wherein the visual fields are tiny cutouts.

13. The tape cassette as claimed in claim 1, wherein the plurality of lines on the at least one disk has a radial arrangement.

14. The tape cassette as claimed in claim 1, wherein the plurality of lines on the at least one disk has a cycloidal arrangement.

15. The tape cassette as claimed in claim 1, wherein the plurality of lines on the at least one disk has an epicycloidal arrangement.

16. The tape cassette as claimed in claim 1, wherein the drawing, in the optical motion effect zones represents light rays.

17. The tape cassette as claimed in claim 1, wherein the drawing, in the optical motion effect zones represents streams of liquid emerging from containers which contain it.

18. The tape cassette as claimed in claim 1, wherein the drawing, in the optical motion effect zones represents waves of water.

19. The tape cassette as claimed in claim 1, wherein the drawing, in the optical motion effect zones represents acoustic projections of musical instruments.

20. The tape cassette as claimed in claim 1, wherein the drawing, in the optical motion effect zones represent waterfalls.

* * * * *

UNITED STATES PATENT AND TRADEMARK OFFICE
CERTIFICATE OF CORRECTION

PATENT NO. : 5,364,040
DATED : November 15, 1994
INVENTOR(S) : Osvaldo Kaplan

It is certified that error appears in the above-indentified patent and that said Letters Patent is hereby corrected as shown below:

Column 4, line 57, Claim 1: "with" should read --which--

Signed and Sealed this

Twenty-fourth Day of October, 1995

Attest:

BRUCE LEHMAN

Attesting Officer

Commissioner of Patents and Trademarks